United States Patent [19]
Hawkins

[11] Patent Number: 6,152,392
[45] Date of Patent: Nov. 28, 2000

[54] RETRACTABLE MICROPHONE HOLDER

[76] Inventor: Johnny L Hawkins, 1805 W. La Rua, Pensacola, Fla. 32501

[21] Appl. No.: 09/292,076

[22] Filed: Apr. 19, 1999

[51] Int. Cl.$^7$ .................................................... B65H 75/48
[52] U.S. Cl. ............................................ 242/379; 381/366
[58] Field of Search ................................ 242/379, 379.2, 242/380; 381/361, 366, 91

[56] References Cited

U.S. PATENT DOCUMENTS

| | | | |
|---|---|---|---|
| 665,800 | 1/1901 | Reno | 242/380 |
| 1,580,220 | 4/1926 | Schwarze . | |
| 4,146,191 | 3/1979 | Cavanaugh | 242/379.2 |
| 4,811,405 | 3/1989 | Peiker | 381/366 |
| 4,856,070 | 8/1989 | Britton et al. | 381/366 |
| 4,953,809 | 9/1990 | Barrus | 242/379 |
| 5,246,183 | 9/1993 | Leyden | 242/379 |
| 5,697,572 | 12/1997 | Salentine et al. | 242/379 |

*Primary Examiner*—John M. Jillions

[57] ABSTRACT

An apparatus for holding a two-way citizens band radio microphone in a designated place in a vehicle includes a retractable tether wound on a spring-biased reel. This allows a user to pull the microphone from its housing and then return it automatically by the tether that may be a cable thirty-eight inches long. The apparatus is adjustable, compact and able to be mounted to any flat, smooth surface by a hook and loop type of fastener.

4 Claims, 4 Drawing Sheets

RETRACTABLE MICROPHONE HOLDER

BACKGROUND—FIELD OF INVENTION

This invention relates to a two way radio microphone, specifically to holding and returning the microphone back to it's designated location without having to look or feel where its goes.

BACKGROUND—DESCRIPTION OF PRIOR ART

U.S. Pat. No. 4,856,070 is a box that contains a chain on a spool that is controlled by a spring mechanism that allows the microphone to be released and to be returned to set position. This requires manipulation of the chain from a locked position.

OBJECTS AND ADVANTAGES

Accordingly, several objects and advantages of my invention are the fact that it is adjustable, compact, inexpense, easy to install, easy to use and durable.

Still further objects and advantages will become apparent from a consideration of the ensuing description and accompanying drawings.

SUMMARY

A simple two way radio microphone holder, designed for citizens band radio, to provide a safe and simple system for retrieving and returning a hand held microphone to it's speciffied location without the use of sight or feeling for the mounting bracket.

PREFERRED EMBODIMENT—DESCRIPTION

Figure 1:
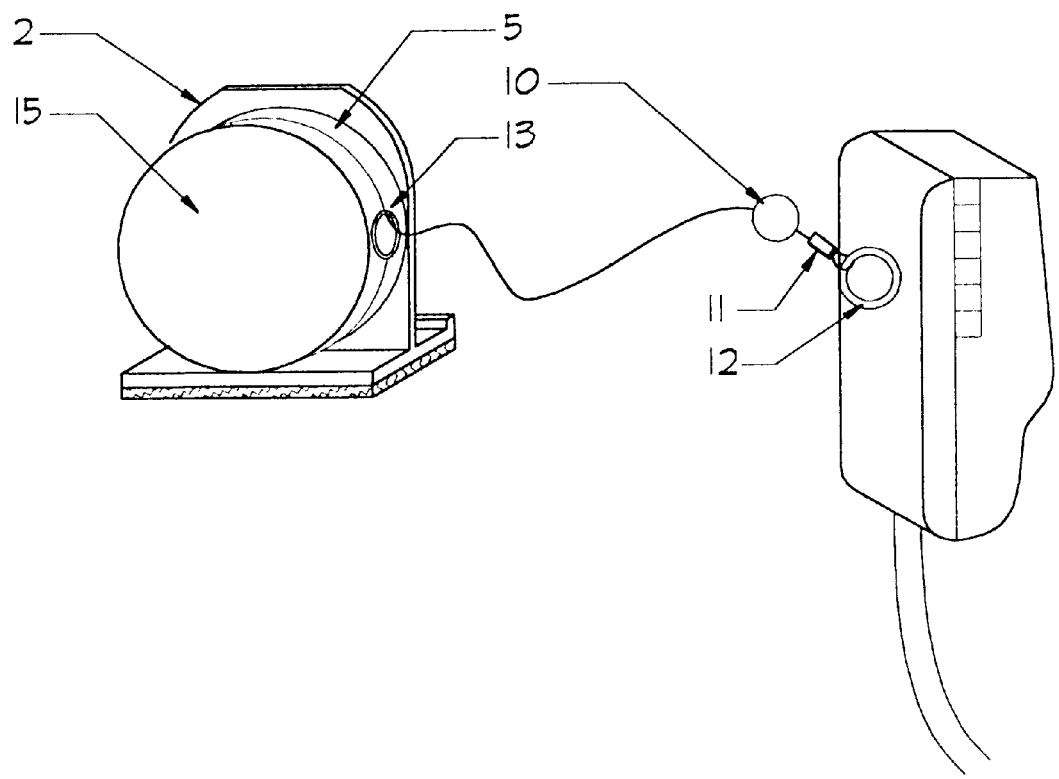
FIG. 1 is a side, elevation view of the device in it's assembled state.
Figure 2:
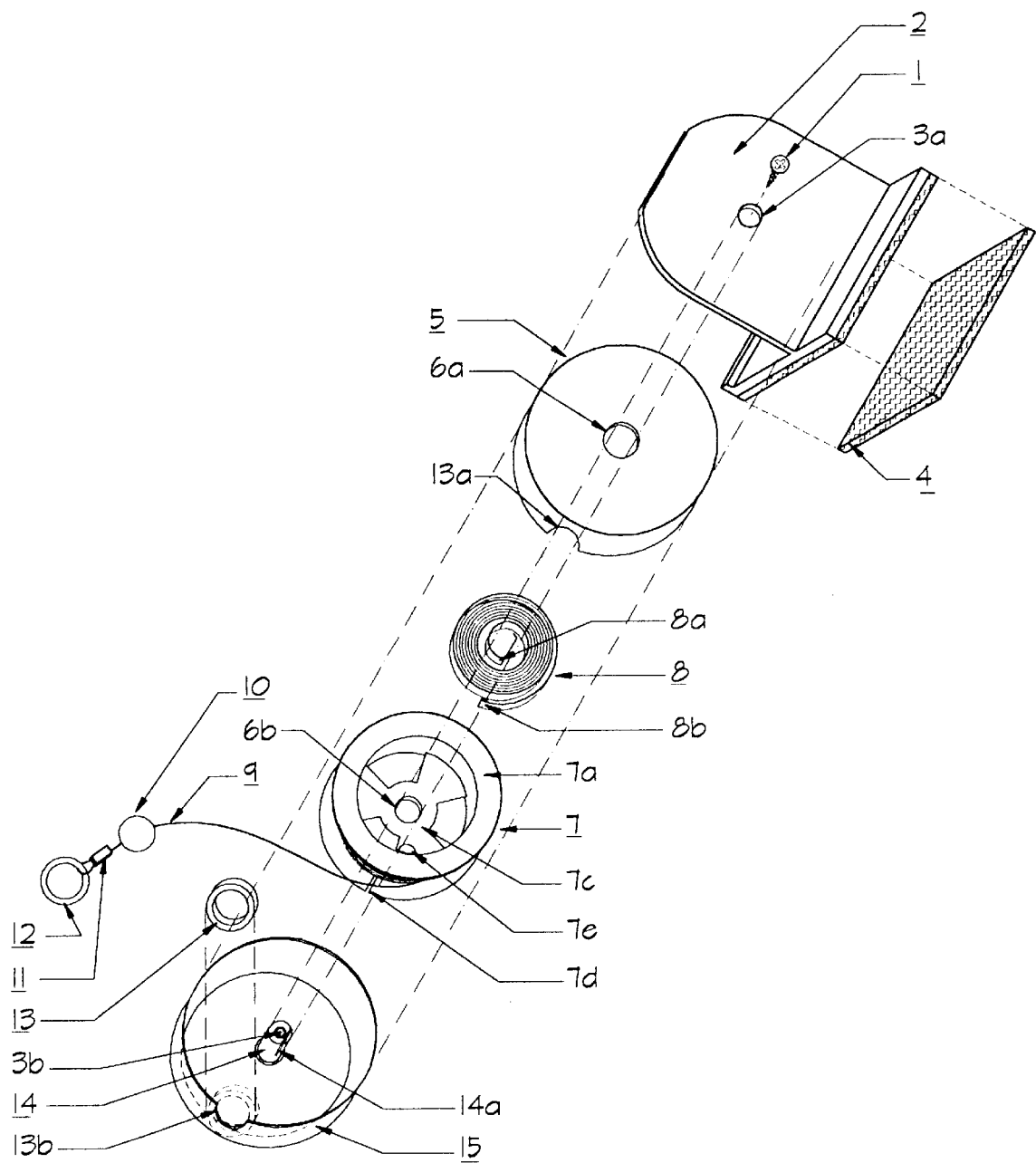
FIG. 2 is an exploded perspective view showing the elements of a preferred embodiment of the microphone retriever according to the invention.
Figure 3:
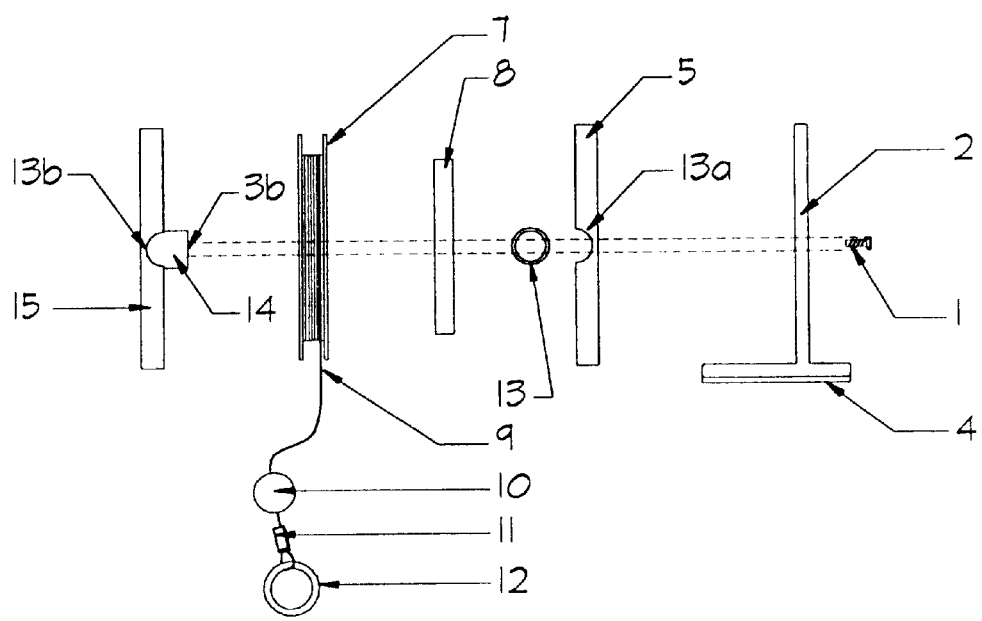
FIG. 3 is a side, cross-sectional view of the preferred embodiment illustrating the assembly and relationship of each of the device's parts.
Figure 4:
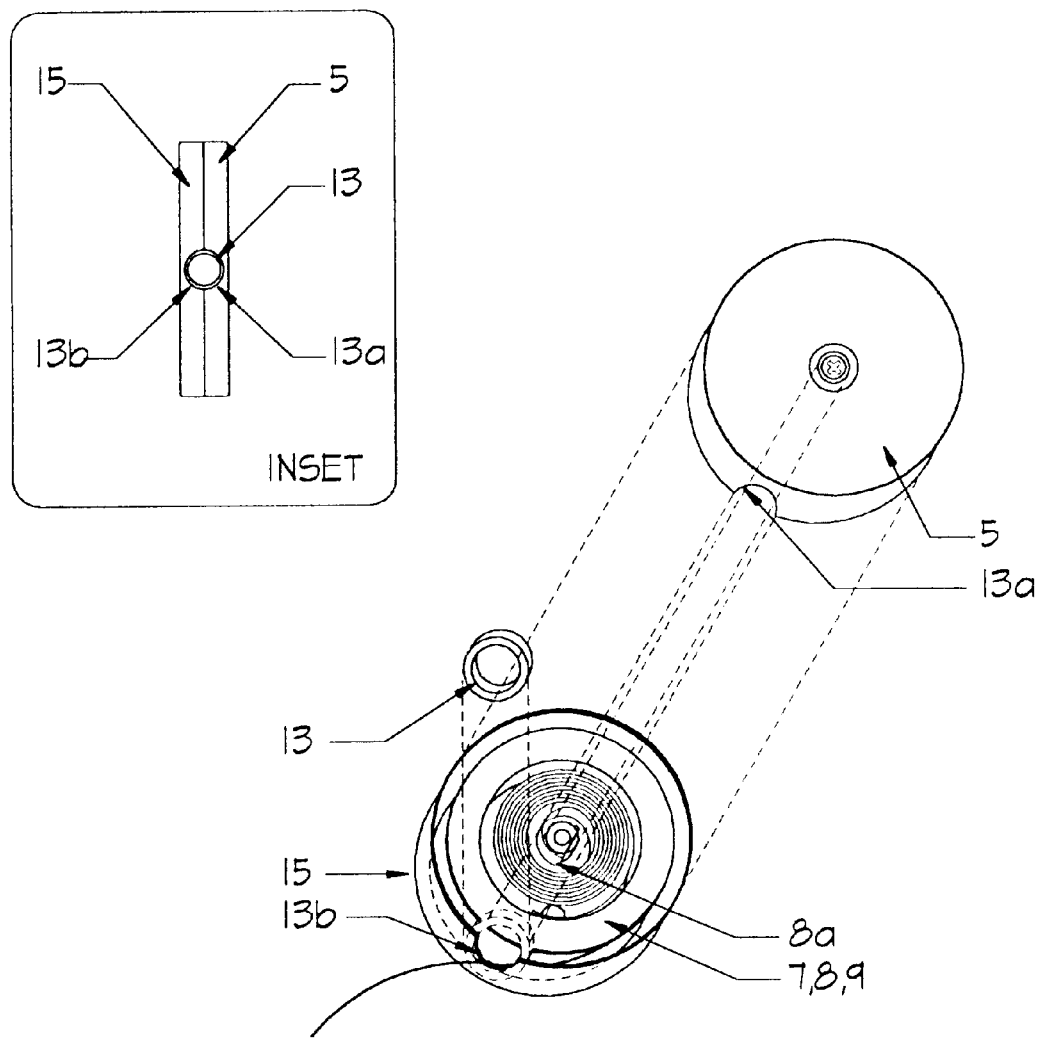
FIG. 4 is an exploded perspective view of the preferred embodiment, illustrating the joining of the spool housing parts with the cable guide eyelet between them.

The retractable microphone holder shown in FIGS. 1–4 includes a housing composed of cup-shaped housing parts 5 and 15 which are joined together by screw 1 passing through opening 3a in a mounting bracket 2, opening 6a in housing part 5, opening 6a in a plastic reel 7, and which then engages in threaded opening 3b in post 14 on housing part 15. The reel 7 is rotatably fitted onto post 14 of housing part 15. The reel 7 includes an outer cylindrical wall 7a having a circular recess 7c for housing a spring assembly 8. The spring assembly 8 includes an inner hook 8a which engages in slot 14a on post 14 and an outer hook 8b which engages in a nub 7e of reel 7. A flexible cable 9 is wound around the reel 7 in a direction such that withdrawal of the microphone from the housing will rotate the reel thereby coiling spring assembly 8. Upon subsequent release of the microphone, spring assembly 8 will rotate the reel to wind the cable back onto the reel. During assembly of the device the inner end of the cable is fastened to the reel and the outer end of the cable passes through metal guide eyelet 13 which mounts in holes 13a and 13b of housing parts 5 and 15 respectively. The outer end of cable 9 is threaded through a plastic stop 10 which remains on the outside of the housing and through a rubber ring 12. The end is then attached to itself by metal sleeve 11. The housing is then attached to the mounting bracket 2 which is placed in a convenient and easy-to-reach location by Velcro attachment 4.

In operation of the device by a user, after attachment of the ring 12 to a microphone and adjustment of the position of the housing on the mounting bracket 2 by twisting of the housing parts 5, 15, the microphone is pulled a desired distance away from the housing for talking and when finished the microphone is guided back to a set location adjacent the housing without having to visually guide it.

Accordingly it can be seen that a tether arrangement for a microphone is provided which is economical, reliable, durable and easily fabricated from plastic and metal parts. The tether arrangement is safe for a user in that a microphone can be returned to a set position without visual contact.

Although the description above contains many specificities, these should not be construed as limiting the scope of the invention but as merely providing illustrations of a preferred embodiment of the invention. Various other embodiments and modifications are possible within its scope. For example a stronger, more durable attachment device connecting the tether to the back of the microphone is contemplated.

Thus the scope of the invention should be determined by the appended claims and their legal equivalents rather than by the examples given.

What is claimed is:

1. A compact retractable hand-held, two-way radio microphone retrieving apparatus installed in a vehicle on any flat surface, comprising in combination:

a plastic mounting structure;

a hook and loop fastening material for securing said mounting structure to a supporting surface;

a housing assembly including a front housing half and a rear housing half, each said housing half having an aperture therein;

a screw extending through the mounting structure and the housing halves for securing the housing assembly to the mounting structure and allowing twisting of the housing assembly on the mounting structure;

a post fixedly secured within the rear housing half;

a plastic reel rotatably mounted on the post;

an elongated flexible cable extending through the housing assembly having an inner end secured to the reel and wound thereabout and having an outer end;

means disposed within the housing assembly for biasing the reel to retract the cable into the housing assembly;

grooves in the housing assembly into which a metal eyelet is mounted for guiding the cable to the outside of the housing assembly;

a rubber expandable ring attached to the outer end of the cable for attaching the cable to a microphone;

and a plastic stop near the outer end of the cable for preventing retraction of the outer end of the cable into the housing assembly.

2. An apparatus as defined in claim 1 the biasing means is a coiled spring connected to the reel.

3. An apparatus as defined in claim 2 wherein the coiled spring is mounted within a recess of the reel.

4. An apparatus as defined in claim 1 wherein the cable is thirty-eight inches in length.

* * * * *